(12) United States Patent
Arulf et al.

(10) Patent No.: US 11,447,276 B2
(45) Date of Patent: Sep. 20, 2022

(54) JOINT AND PAYLOAD DISPENSER

(71) Applicant: Ruag Space AB, Gothenburg (SE)

(72) Inventors: Örjan Arulf, Linköping (SE); Johan Öhlin, Rimforsa (SE); Magnus Thenander, Linköping (SE)

(73) Assignee: Ruag Space AB, Gothenburg (SE)

( * ) Notice: Subject to any disclaimer, the term of this patent is extended or adjusted under 35 U.S.C. 154(b) by 374 days.

(21) Appl. No.: 16/612,008

(22) PCT Filed: Jan. 25, 2018

(86) PCT No.: PCT/SE2018/050058
§ 371 (c)(1),
(2) Date: Nov. 12, 2019

(87) PCT Pub. No.: WO2018/208201
PCT Pub. Date: Nov. 15, 2018

(65) Prior Publication Data
US 2021/0107690 A1    Apr. 15, 2021

(30) Foreign Application Priority Data

May 10, 2017   (WO) .................. PCT/SE2017/050472

(51) Int. Cl.
*B64G 1/64*        (2006.01)
*B64G 1/00*        (2006.01)

(52) U.S. Cl.
CPC ............. *B64G 1/641* (2013.01); *B64G 1/002* (2013.01); *B64G 1/645* (2013.01); *B64G 2001/643* (2013.01)

(58) Field of Classification Search
CPC ........ B64G 1/641; B64G 1/002; B64G 1/645; B64G 2001/645; F16B 2/12; F16B 2200/509; F16B 5/072
See application file for complete search history.

(56) References Cited

U.S. PATENT DOCUMENTS 3,465,995 A  *  9/1969  Louis .................. F16B 2/12
                                              248/228.3
5,411,226 A  *  5/1995  Jones .................. B64G 1/1085
                                              244/173.3

(Continued)

FOREIGN PATENT DOCUMENTS

CN       106043744 A      10/2016
FR           923264 A       7/1947
(Continued)

OTHER PUBLICATIONS

International Search Report and Written Opinion dated May 9, 2018 for International Application No. PCT/SE2018/050058, 14 pages.
(Continued)

*Primary Examiner* — Medhat Badawi
*Assistant Examiner* — Vicente Rodriguez
(74) *Attorney, Agent, or Firm* — Sage Patent Group

(57) ABSTRACT

A payload dispenser for a launch vehicle including a plurality of panels, wherein at least one panel includes at least one payload mounted onto the panel. The panels are attachable to each other by means of attachment means in the form of at least one payload dispenser joint whereby a self-supporting dispenser is formed.

19 Claims, 13 Drawing Sheets

(56) References Cited

U.S. PATENT DOCUMENTS

| | | | |
|---|---|---|---|
| 5,613,653 A * | 3/1997 | Bombled | B64G 1/641 |
| | | | 244/173.1 |
| 5,884,866 A | 3/1999 | Steinmeyer et al. | |
| 6,138,951 A | 10/2000 | Budris et al. | |
| 6,276,639 B1 | 8/2001 | Hornung et al. | |
| 6,296,206 B1 * | 10/2001 | Chamness | B64G 1/00 |
| | | | 244/173.3 |
| 6,557,802 B2 | 5/2003 | Kroeker | |
| 9,463,882 B1 | 10/2016 | Field et al. | |
| 10,811,746 B2 * | 10/2020 | Ishizuka | H01P 1/042 |
| 2002/0179776 A1 | 12/2002 | Mueller et al. | |
| 2007/0063107 A1 | 3/2007 | Mueller et al. | |
| 2012/0112010 A1 | 5/2012 | Young et al. | |
| 2014/0131521 A1 | 5/2014 | Upland et al. | |
| 2014/0314476 A1 * | 10/2014 | Tamiozzo | F16B 2/12 |
| | | | 403/338 |
| 2015/0232205 A1 | 8/2015 | Lively et al. | |
| 2016/0304222 A1 | 10/2016 | Fernandez et al. | |
| 2016/0368625 A1 * | 12/2016 | Field | B64G 1/641 |

FOREIGN PATENT DOCUMENTS

| | | |
|---|---|---|
| FR | 2584115 A1 | 1/1987 |
| JP | 2000153800 A | 6/2000 |
| WO | 2003033349 A1 | 4/2003 |
| WO | 2013080172 A1 | 6/2013 |

OTHER PUBLICATIONS

International Search Report and Written Opinion dated Feb. 9, 2018 for International Application No. PCT/SE2017/050472, 13 pages.

* cited by examiner

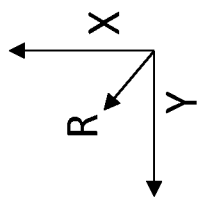
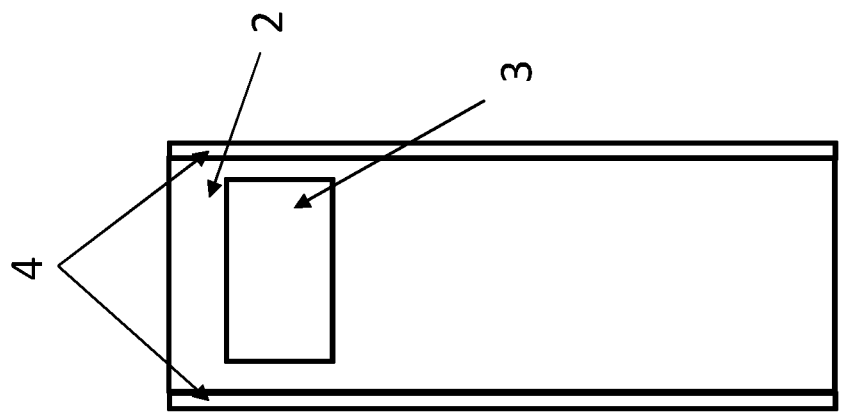
Fig. 4c
Fig. 4b
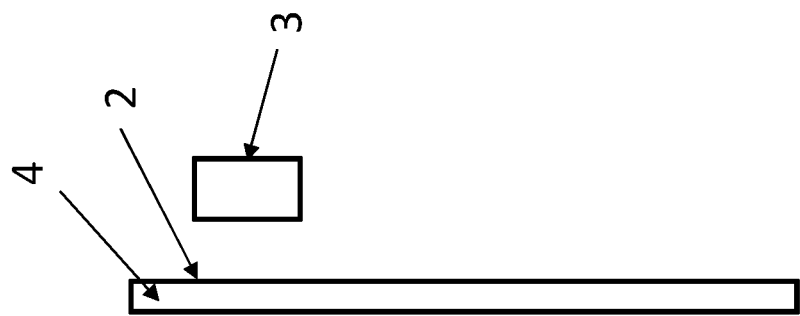
Fig. 4a

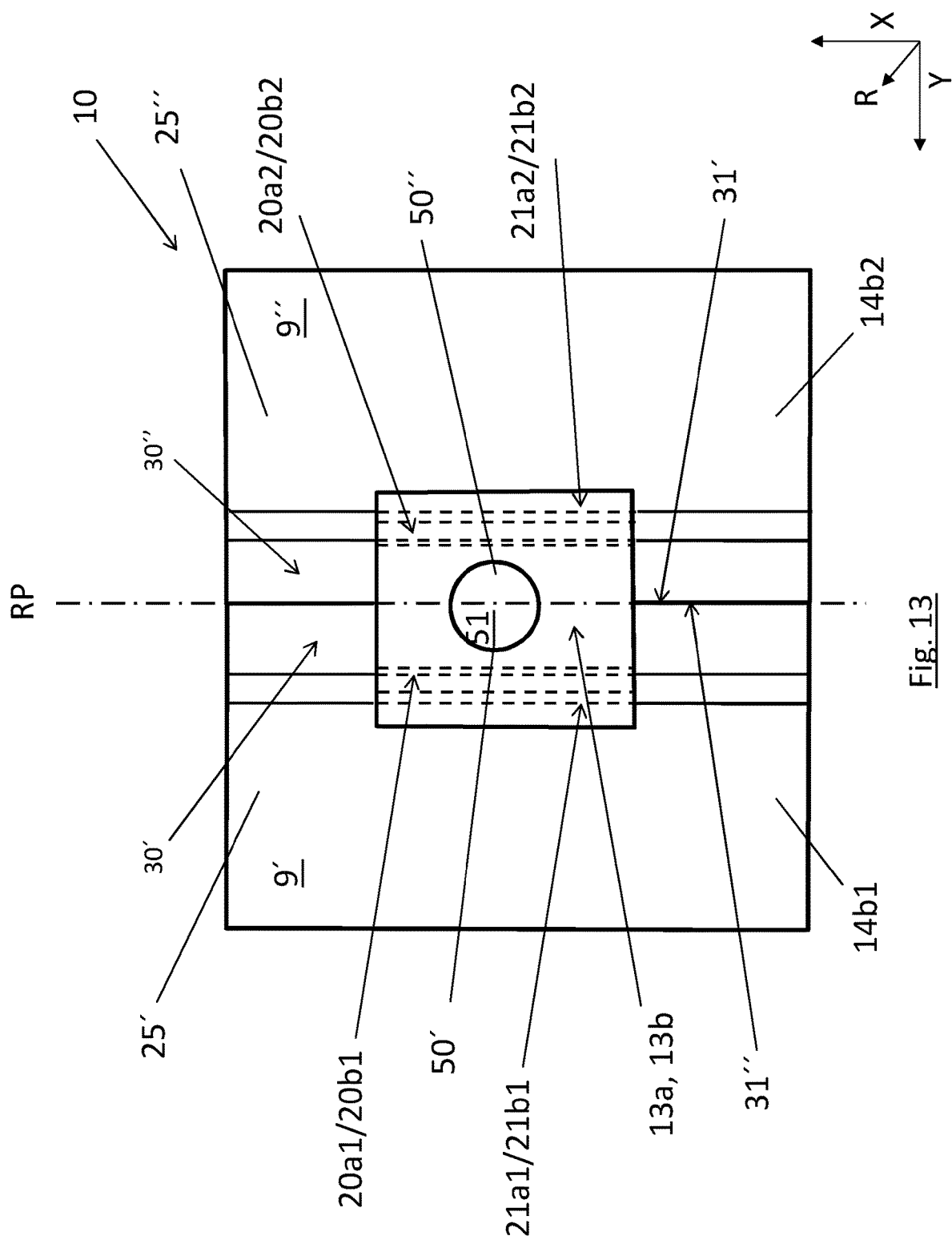

JOINT AND PAYLOAD DISPENSER

CROSS-REFERENCE TO RELATED APPLICATIONS

This application is a 35 U.S.C. § 371 national stage application of PCT International Application No. PCT/SE2018/050058 filed on Jan. 25, 2018, which claims priority to PCT International Application No. PCT/SE2017/050472 filed on May 10, 2017, the disclosures and contents of which are hereby incorporated by reference in their entireties.

TECHNICAL FIELD

The present disclosure relates to a payload dispenser for a launch vehicle comprising a panel and a payload; and to a payload dispenser joint for such a dispenser. The disclosure further relates to a method for assembly of the payload dispenser.

BACKGROUND

The preparation and integration of multiple satellites onto a dispenser or launcher is traditionally an intricate and time consuming task. Typically the amount of time needed to integrate one satellite onto the launcher is many hours. For a large dispenser intended for launch of constellation satellites the number of satellites in a launch can be up to and above 100. This amounts to approximately 10 weeks integration time doing it the classical way.

There is thus a need for an improved payload dispenser and method for the same that improves the integration time.

SUMMARY

An object of the present disclosure is to provide an improved payload dispenser, an improved payload dispenser joint and an improved method for assembly of the dispenser. These objects are at least partly achieved by the features of the independent claims. The dependent claims contain further development of the payload dispenser and the payload dispenser joint.

The disclosed payload dispenser further eliminates the need for a plurality of support structures which in turn relocates and/or removes structural mass from e.g. interface structures on the dispenser. Yet further advantages are reduced number of parts and simplified tools required, which allows for shorter lead times and lower tooling costs.

The disclosure relates to a payload dispenser for a launch vehicle. The dispenser comprises a plurality of panels and at least one panel comprises at least one payload mounted onto the panel. The panels are attachable to each other forming a self-supporting dispenser. It should be noted that the assembled dispenser is a primary load bearing and self-supported structure. Here, primary load bearing refers to that the dispenser transfers the loads from the Launch Vehicle to the payload(s). The primary load carrying structure is designed as a facetted tube with detachable sides and the number of panels can be anything from three to more than ten.

According to one example, each panel comprises at least one payload. According to one example, at least one panel comprises a plurality of payloads.

Hence, the number of payloads per panel can vary between zero and a plurality. However, the dispenser always comprises at least one payload. The payload is advantageously positioned to balance the dispenser. Hence, the payload can be arranged symmetrically about the dispenser. For example, the dispenser comprises two opposing payloads positioned on opposing panels. Hence, one payload is positioned on one panel and the other is positioned on an opposing panel. The panels positioned between the payload mounted panels can then be free from payload. According to another example, all panels comprise at least one payload. If balance is part of the design parameter normal rules of symmetry apply for balancing the dispenser should the dispenser without the payload be balanced in itself. If the dispenser without the payload is not balanced, then the position of the payload can be used to create balance. Here, balance could refer to rotation and/or gravity symmetry about a fictive central longitudinal axis about which the dispenser is built.

The payload is advantageously mounted onto the panel before assembly of the dispenser. The payload is typically attached to an outside of the panel via payload mounting and separation means positioned in openings running from the outside and through the panel to a backsheet of the panel. The mounting and separation means are attached to the payload at one end and secured to the panel via securing means on the other end. One advantage with attaching the payload on the panels before assembly of the panels to each other is that the free panel grants easy access to the payload mounting and separation means compared to should the payload be attached to an already assembled dispenser structure. Furthermore, in prior art the payload is attached to a support structure that is attached to a dispenser body. With reference to that prior art, the panels gives the advantage that it grants access to the backside of the panels also when assembled into the dispenser without further tooling of a dispenser body. A further advantage is that the payload dispenser can be transported in sections, i.e. the panels, instead of in one very large and bulky entity. Hence, the panel is in itself self-supported such that it can be transported with the payload attached to it.

According to one example, the payload is a satellite. One or more panels may also comprise different or additional payloads such as cables, energy sources and communication devices.

The payload dispenser has an extension in a longitudinal direction and in a radial direction with reference to cylindrical coordinates. The reference system is chosen to simplify the description of the payload dispenser and should not be seen as limiting per se. The Longitudinal direction is typically the height direction and the radial direction is perpendicular to the longitudinal direction. With reference to the chosen reference system, the payload dispenser is delimited in the radial direction by the panels forming an envelope surface. Each panel comprises longitudinal attachment means in the longitudinal direction being attachable to neighboring panels. Hence, the panels are attachable to each other in an interface running in the longitudinal direction.

The attachment means are arranged to lock in position with relation to each other to allow for the self-supporting dispenser. The attachment means are arranged to be connected to each other during dispenser assembly and are arranged to fixate the panels in relation to each other. Here, lock in position and fixate refers to that the attachment means engage each other such that when the panels are positioned at a predetermined angle to each other, the panels cannot be hingeably rotated with relation to each other nor can they be moved in the longitudinal direction. Furthermore, today there exist a number of demands regarding the performance of the dispenser assembly, for example stiffness and the attachment means are arranged to meet such demands.

According to one example, the attachment means are arranged to allow for disassembly of parts of or the entire payload dispenser. This has the advantage that should a payload be faulty, the panel onto which the faulty payload is attached can be removed and exchanged to another panel instead of the more complicated task of removing and exchanging the payload itself as discussed above.

As mentioned before, the payload dispenser is delimited in the radial direction by the panels when assembled. Furthermore, the panels themselves can be described as being delimited in the longitudinal direction and a lateral direction being perpendicular to the longitudinal direction. When the dispenser is assembled by the panels the attachment means lie in the envelope surface.

According to one example, at least one or each panel has an unbroken extension in the longitudinal direction. Here, unbroken refers to that the panel is not assembled by parts in the longitudinal direction. However, the panel can be made from a single layer or a combination of layers in the thickness direction. Here, the thickness direction refers to the radial direction when the panels are assembled into the dispenser.

According to one example, at least one panel comprises panel portions attached to each other forming the panel. According to one example, the panel portions are assembled in the longitudinal direction, i.e. the height direction. Here the at least one of the panel portions comprises laterally extending attachment means for assembly of the panel along the lateral direction being perpendicular to the height direction. The panel portions are also assembled in the longitudinal direction via the longitudinally extending attachment means forming the dispenser. Also here, the panel portions and thus the panels can be made from a single layer or a combination of layers in the thickness direction.

The panel portions are thus fixedly attached to each other via the longitudinal attachment means and via the lateral attachment means when applicable. The attachment means are arranged to lock in position with relation to each other to allow for the self-supporting dispenser according to what have been described above.

The disclosure also relates to a method for assembly of a payload dispenser according to any one of the preceding claims, wherein the method comprises the steps of
  a. mounting at least one payload onto one panel,
  b. attaching the panels to each other via longitudinally extending attachment means,
  c. locking the attachment means in position to hinder movement between the panels, and if applicable the panel portions, forming a self-supporting dispenser.

According to one example, the method comprises the step of mounting at least one payload onto each panel before assembly of the panels.

According to one example, the method comprises the step of attaching panel portions to each other via laterally extending attachment means.

As described above, the panels can be made from panel portions and the panel portions are connected to each other via laterally extending attachment means. The panels are attached to each other via the longitudinally extending attachment means. According to one example, the panel portions are attached to each other via the laterally extending attachment means before the panels are attached to each other via the longitudinally extending attachment means. According to another example, panel portions are attached to each other via longitudinally extending attachment means forming dispenser portions and the panel portions are then attached to each other via the laterally extending attachment means. In the latter example the dispenser can thus be built in sections, i.e. the dispenser portions, where the dispenser portions are positioned on top of each other in the height direction, i.e. the longitudinal direction.

Above have been described attachment means suitable for detachably attaching, i.e. connecting, panels in the longitudinal direction X and/or lateral direction Y. According to the specification, the attachment means comprises at least one payload dispenser joint in the longitudinal direction X or lateral direction Y.

According to one example, the longitudinal and/or lateral attachment means comprises one payload dispenser joint arranged along essentially the entire longitudinal and/or lateral edge extension of respective panel. According to another example, the longitudinal and/or lateral attachment means comprises at least one, but preferably at least two, payload dispenser joints arranged at the longitudinal and/or lateral edge extensions of respective panel. The payload dispenser joints are defined as arrangements capable of connecting, or locking together two neighboring panel portions in a detachable manner.

The number of panels in the payload dispenser can be chosen dependent on design of the dispenser. The design can be limited by e.g. size and/or payload mass, launch vehicle configuration or other design requirements.

It should be noted that seen from the side, i.e. in the radial direction, and in a two-dimensional projection, the dispenser can have an essentially cylindrical form, a conical shape or a combination thereof. Seen from above, i.e. in the longitudinal direction, the number of panels gives a polygon shape with at least three sides. The panels can be flat or curved and the panels can have an even thickness or the thickness can vary dependent on design of the dispenser.

Each panel is designed with considerable out of plane stiffness, typically a sandwich or possibly a grid plate. On this plate interfaces to separation interfaces will be integrated, typically by introducing inserts in a sandwich or just holes or threads in a machined grid plate. As the primary sizing of the panel is driven by the need for a stiff behavior of the integrated facetted tube together with sufficient out of plane stiffness for the satellite I/F points these parameters are controlled by sandwich height and panel sheet stiffness.

The design of the panels allows for integration into the final dispenser with minimal access to the external side of the panel where maximum volume is allocated to the payload (satellites).

It is preferred to design the panel attachment means so a bending moment can be transferred to conserve the bending stiffness of the panels in circumferential direction, thus avoiding local eigenmodes that can arise due to the dynamic launch environment.

As stated above, the present disclosure also relates to a payload dispenser joint for detachably attaching to each other two adjacent panels of a payload dispenser for a launch vehicle. The joint comprises a clamp, in turn comprising an inner clamp portion and an outer clamp portion facing the inner clamp portion. Each clamp portion comprises a through opening, wherein the joint comprises a bolt configured to be arranged in the through openings. Depending on how long the clamp is, a number of bolts are possible to be used. The number of through opening then corresponds to the number of bolts.

The inner clamp portion comprises a first and second inner clamp flange and an inner mid portion between the first and second inner flanges. The outer clamp portion comprises a first and second outer clamp flange and an outer mid portion between the first and second outer flanges. The joint further comprises a first panel end portion of a first panel comprising a first end section and a second panel end portion of a second panel comprising a second end section. The first and the second panels referred to are neighboring panels of a payload dispenser. The first end section comprises a first outer panel flange and a first inner panel flange, wherein the second end section comprises a second outer panel flange and a second inner panel flange. The first end section comprises a first contact surface formed by a portion of an outer surface of the first outer panel flange and by a portion of an outer surface of the first inner panel flange. The second end section comprises a second contact surface formed by a portion of an outer surface of the second outer panel flange and by a portion of an outer surface of the second inner panel flange. The first and second contact surfaces are abutting each other in the joint forming a reference plane. Furthermore;

a first inner clamp locking surface of the first inner clamp flange is arranged at a first angle to the reference plane, a first outer clamp locking surface of the first outer clamp flange is arranged at a second angle to the reference plane, a second inner clamp locking surface of the second inner clamp flange is arranged at a third angle to the reference plane, a second outer clamp locking surface of the second outer clamp flange is arranged at a fourth angle to the reference plane, a first inner panel locking surface of the first inner panel flange is arranged at a fifth angle to the reference plane, a first outer panel locking surface of the first outer panel flange is arranged at a sixth angle to the reference plane, a second inner panel locking surface of the second inner panel flange is arranged at a seventh angle to the reference plane, and a second outer panel locking surface of the second outer panel flange is arranged at an eight angle to the reference plane.

The angled parts of the clamp flanges together with angled parts of the panel flanges has the effect that the end sections are forced towards each other as the payload dispenser joint is tightened by pressing the inner clamp portion against the outer clamp portion by means of the bolt. This type of joint provides a stiff and reliable joint with a high capability to transfer loads between the panels. Due to the high load capability of one single joint, the total number of joints within the panel dispenser may thus be minimized. This in turn has the advantage that the time to assemble the panels is minimized. There is also the advantage of minimized man hours due to the simplicity but yet high load capacity. The joint can be disassembled by loosening or removing the bolt whereby the panel may be disconnected. The clamp flanges encloses the panel flanges and the angle gives a force vector coinciding with the extension of the bolt and a force vector pointing in a direction perpendicular to the extension of the bolt, i.e. in a direction forcing the panel end portions together. The choice of angles determines how much of the force that is directed in the direction coinciding with the extension of the bolt and in the direction perpendicular to the extension of the bolt. Hence, there are design parameters that governs how and where the pinching force is applied onto the flanges. With a smaller angle the force from the bolt is directed in greater part in the direction perpendicular to the extension of the bolt than should the angle be greater.

The first inner clamp flange is arranged against the first inner panel flange and the first angle is equal to or smaller or greater than the fifth angle. The first outer clamp flange is arranged against the first outer panel flange and the second angle is equal to or smaller or greater than the sixth angle. The second inner clamp flange is arranged against the second inner panel flange and the third angle is equal to or smaller or greater than the seventh angle. The second outer clamp flange is arranged against the second outer panel flange and the fourth angle is equal to or smaller or greater than the eight angle.

According to one example, the first, second, third and fourth angles are smaller than the interacting fifth, sixth, seventh and eight angles. The effect would then be an enhanced effect of that the first end section of the first panel end portion and the second end section of the second panel end portion, will be forcefully pressed against each other at the contact surfaces of respective end section.

According to one example, the first, second, third and fourth angles are equal to the interacting fifth, sixth, seventh and eight angles. The effect would then be an even force distribution over the locking surfaces and a more evenly distributed force pattern between the first end section of the first panel end portion and the second end section of the second panel end portion.

According to one example, the first, second, third and fourth angles are greater than the interacting fifth, sixth, seventh and eight angles. The effect would then be an enhanced effect of that the first end section of the first panel end portion and the second end section of the second panel end portion, will be forcefully pressed against each other at the contact surfaces of respective end section.

It should be noted that further examples are possible with different angles. For example, the outer clamp portion can have different angles compared to the inner clamp portion. Furthermore, the outer clamp portion and/or the inner clamp portion can have different angles with relation to different clamp locking surfaces. The angles in the clamp flanges can be varied in a corresponding way as in the examples above.

The panel flanges have an extension in the longitudinal direction, the lateral direction and also in the thickness direction. The clamp flanges have an extension in the longitudinal direction, the lateral direction and also in the thickness direction. According to one example, the panel flanges have an extension in the thickness direction being equal to the clamp flanges. This has the advantage that the mid portion provided between the flanges can contact the outer surface of the panel flange such that the panel flanges becomes aligned due to the force from the opposing mid portions. According to one example, the panel flanges have an extension in the thickness direction being smaller than the clamp flanges. This has the advantage that the outer most portions of the clamp flanges can contact an outer surface of the panel such that the panel flanges becomes aligned due to the force from the opposing clamp flanges. According to one example, the panel flanges have an extension in the thickness direction being longer than the clamp flanges. This has the advantage that the mid portion provided between the flanges can contact the outer surface of the panel flange such that the panel flanges becomes aligned due to the force from the opposing mid portions. It should be noted that the choice of angles also have a bearing on how much force that the clamp flanges can apply on the panel flanges in a direction perpendicular to a bolt having an extension through the clamp portions, i.e. in a direction forcing the panel end portion of the panel flanges together.

According to another exemplary aspect of the present invention the first end section and the second end sections of the panels comprise cooperating channels forming a through opening for receiving the bolt of the joint. Should more than one bolt be used then the panels would comprise corresponding number of through openings.

According to one exemplary aspect of the present disclosure at least the inner clamp portion comprises a threaded through opening for allowing an at least partly threaded bolt to be threaded in the threaded opening.

This exemplary aspect of the present disclosure has the exemplary advantage that no separate bolt nut is needed to assemble the payload dispenser joint.

Hence, according to one example of the present disclosure the bolt is threaded, whereby the payload dispenser joint may be assembled by allowing the threaded bolt to pass through the through openings of the clamps and cooperating channels and threading an interacting bolt nut onto the bolt, whereby the payload dispenser joint can be tightened.

Advantages

The concept makes use of the structural mass in an effective way. All mass is contributing with stiffness both during integration and during launch. Hence the concept is mass effective.

The dispenser is easy transportable in flat packages before integration, i.e. assembly of the dispenser.

The structural design becomes modular; a panel can just be replaced in case of damages, which minimizes risk.

The tooling for the dispenser is much simplified since no layup tool with several months lead time is needed, simple flat panels is sufficient. Saves time and cost.

No machining of an oversized central cylinder is required, simplifies logistics and saves machining costs.

No big and expensive assembly rig is needed. The interface points, hereinafter called I/F points, on the panels are machined to high precision during panel manufacturing with simple drill jigs. This saves tooling costs and assembly time and removes the need for liquid shimming.

A multi sided dispenser will inherently have stiff I/F points in the corners simplifying the interface towards a launch adapter.

Although the primary approach is to aim at a mass optimized carbon fiber sandwich design the concept works very well with a grid panel design providing significant cost savings at the expense of mass. As many constellation launces will be strictly volume driven due to satellite size, the extra mass may well be fully acceptable.

The use of a flat panel with full freedom to locate the I/F point anywhere on the plane, the design can be used both for the classical 4-bolted I/F used in most dispensers today, but also for mounting of a small clamp band system.

A payload dispenser joint according to the present disclosure has the exemplary effect that a reliable and rigid means for detachably attaching panels of a payload dispenser is provided.

BRIEF DESCRIPTION OF DRAWINGS

The disclosure will be described in greater detail in the following, with reference to the attached drawings, in which
FIG. 1 schematically shows a top view of a payload dispenser;
FIG. 4a schematically shows a side view of a panel and a payload before assembly;
FIG. 4b schematically shows a side view of a panel and a payload after assembly;
FIG. 4c schematically shows a front view of a panel and a payload.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
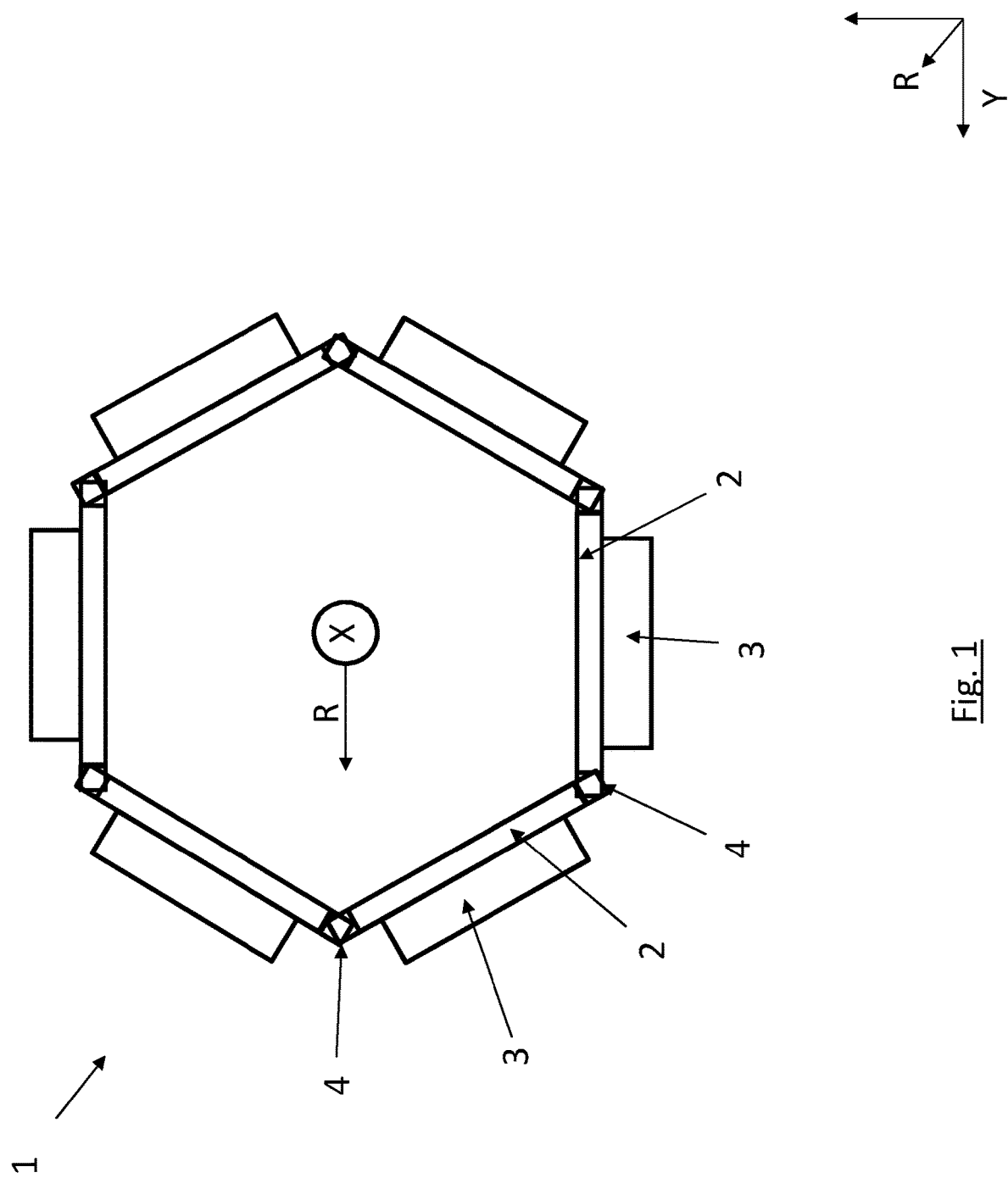

FIG. 1 schematically shows a top view of a payload dispenser 1 for a launch vehicle. The dispenser 1 comprises a panel 2 and a payload 3. The dispenser 1 comprises a plurality of panels 2 wherein at least one panel 2 comprises at least one payload 3 mounted onto the panel 2. FIG. 1 shows that the panels 2 are attachable to each other via attachment means 4 forming a self-supporting dispenser 1. The attachment means 4 comprises at least one payload dispenser joint 10, as will be disclosed more in detail below. FIG. 1 shows six panels 2 attached to each other. However, any plurality of panels 2 is possible but with a minimum of three panels in order to form a dispenser 1.

Figure 6:
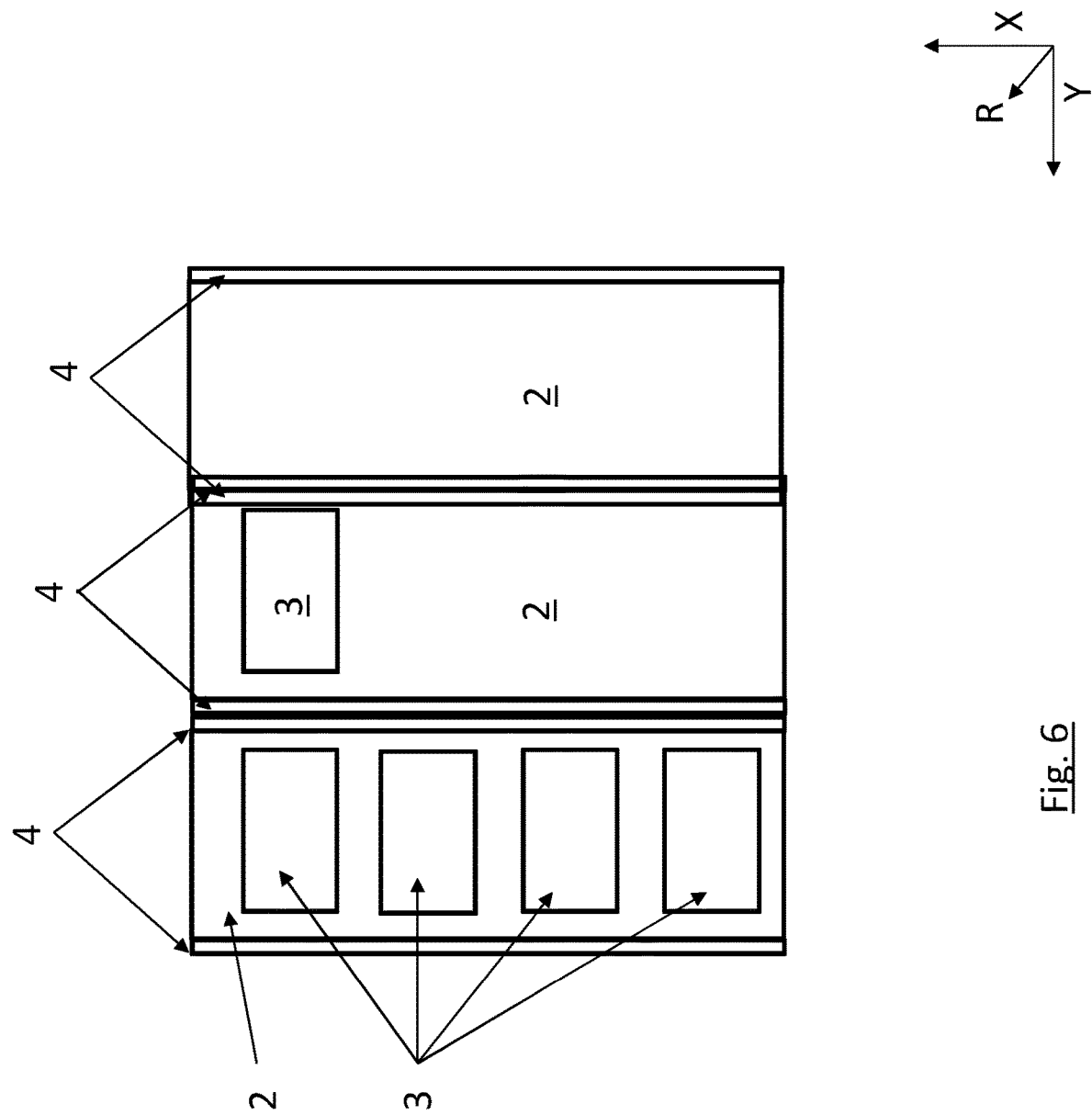
FIG. 6 schematically shows a front view of three panels attached to each other.

FIG. 1 shows that each panel 2 comprises at least one payload 3. According to another example shown in FIG. 6, one of the panels 2 in the dispenser 1 can be without any payload 3 while other panels 2 carry payload. Furthermore, as shown in FIGS. 2a-2b and 6, at least one panel 2 comprises a plurality of payloads 3.

According to one example, the payload 3 is a satellite.

In FIGS. 1-8, the payload dispenser 1 has an extension in a longitudinal direction X and in a radial direction R. Each panel 2 comprises attachment means in the longitudinal direction X being attachable to neighbouring panels 2.

The payload dispenser 1 is delimited in the radial direction R by the panels 2 forming an envelope surface and the panels 2 are attachable to each other in an interface running in the longitudinal direction X.

The attachment means 4 are arranged to lock in position with relation to each other to allow for the self-supporting dispenser 1.

The dispenser 1 is a primary load bearing structure that can carry one or more payloads. The payload can be arranged to be separated from the dispenser in a controlled manner via separation means. For this to happen, the payload dispenser comprises additional equipment connecting the separation means (not shown) to a control device (not shown). The control device is arranged to control the separation means to separate and eject the payload at a certain point in time and in a pre-determined direction.

FIG. 2a schematically shows a side view of a panel and payloads before assembly.

FIG. 2b schematically shows a side view of a panel and payloads after assembly. FIGS. 2a and 2b shows that the payload 3 is mounted onto the panel 2 before assembly of the dispenser 1.

Figure 2C:
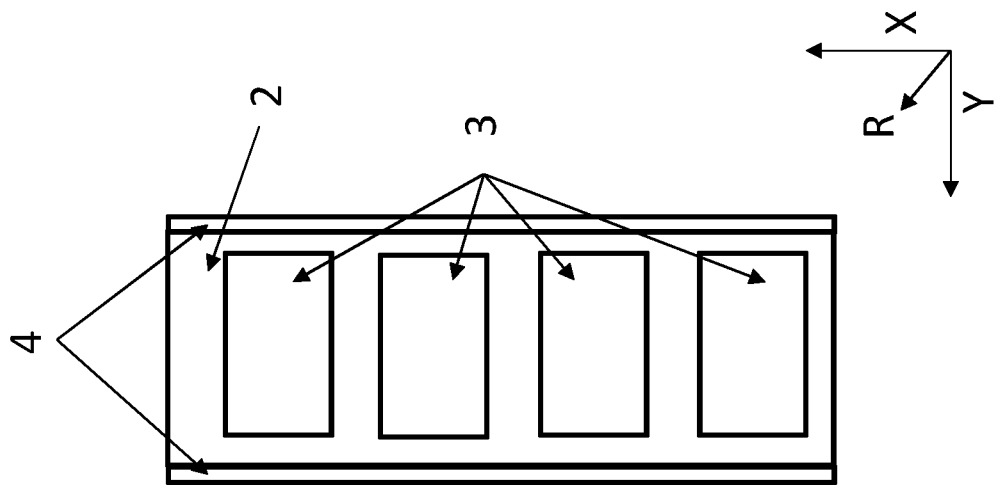
FIG. 2c schematically shows a front view of a panel and payloads.
Figure 2B:
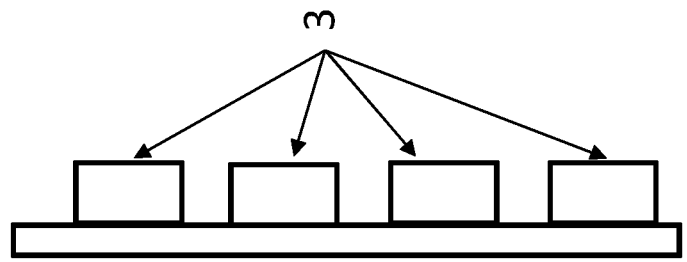
FIG. 2b schematically shows a side view of a panel and payloads after assembly.
Figure 2A:
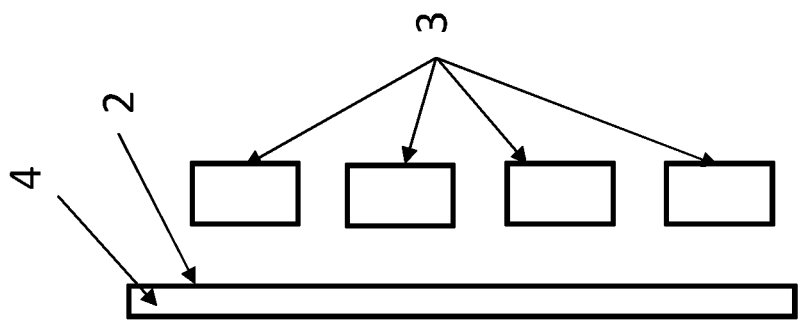
FIG. 2a schematically shows a side view of a panel and payloads before assembly.

FIG. 2c schematically shows a front view of a panel and payloads according to FIGS. 2a and 2b.

Figure 3:
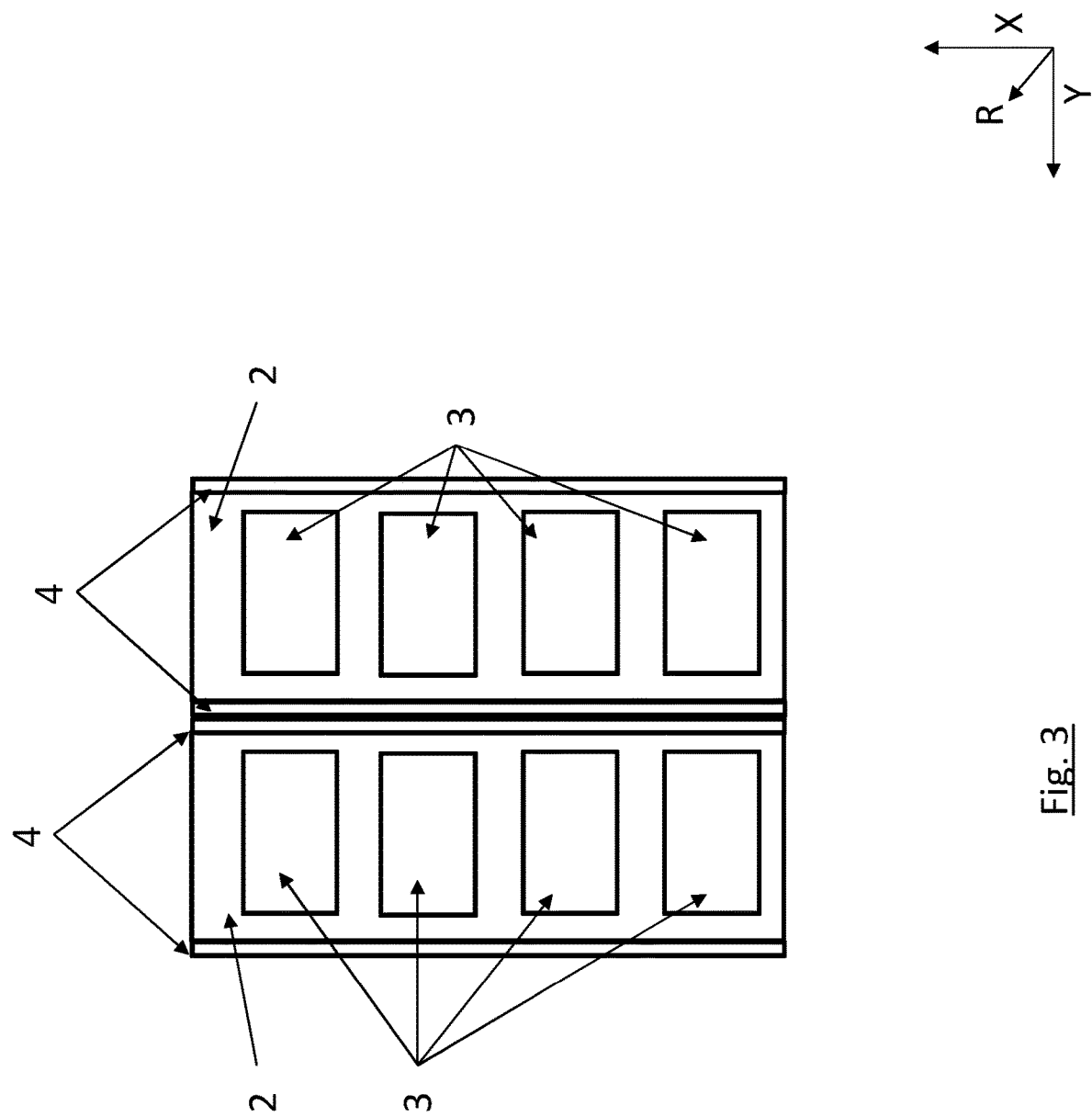
FIG. 3 schematically shows a front view of two panels attached to each other.
Figure 7:
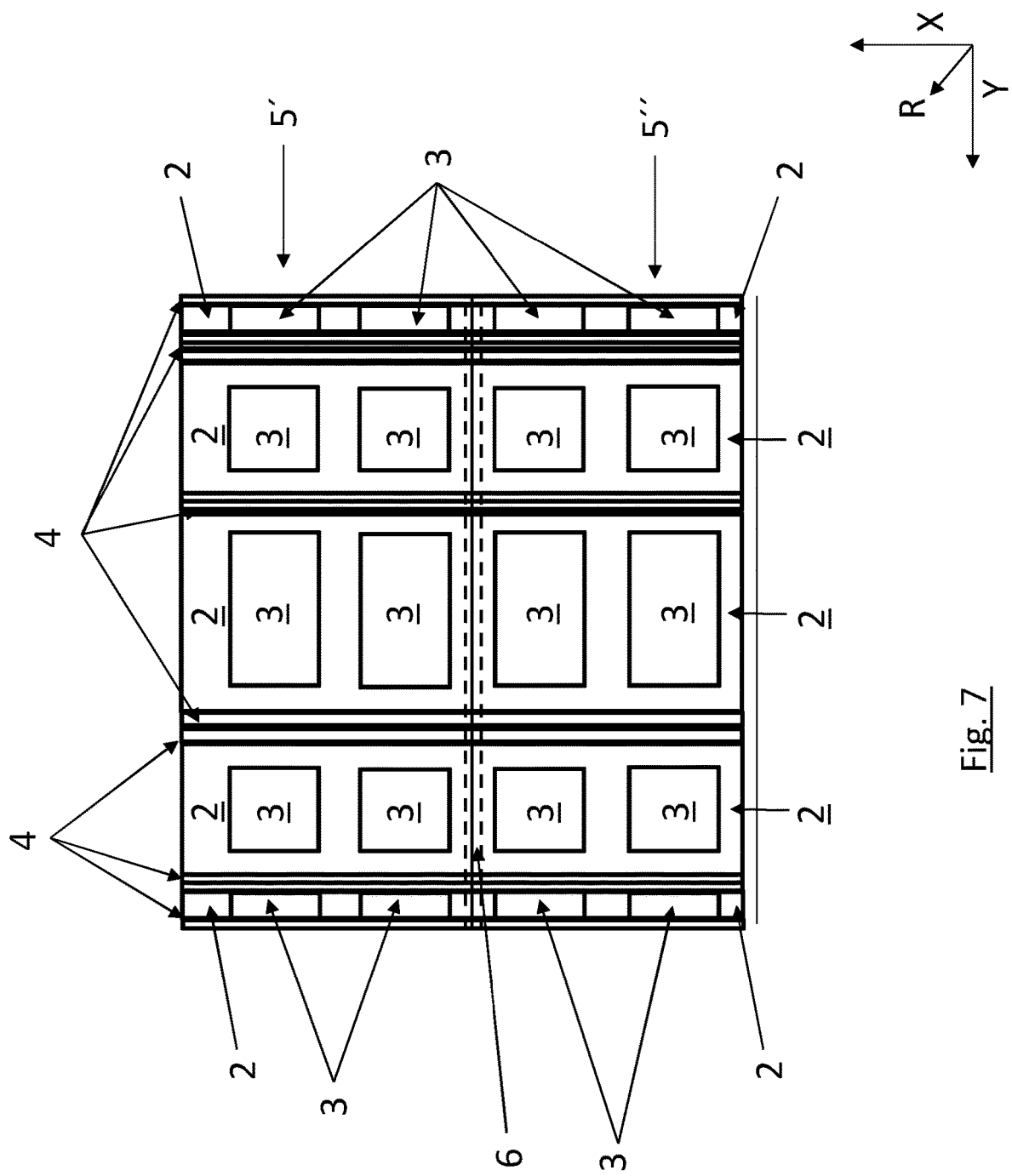
FIG. 7 schematically shows a side view of an assembled payload dispenser.

FIG. 3 schematically shows a front view of two panels attached to each other. FIG. 3 shows that the payload dispenser 1 is delimited in a lateral direction Y by the panels 2. In FIG. 3, each panel 2 has an unbroken extension in the longitudinal direction X. However, as can be seen in FIG. 7, the panels 2 can be made from panel portions 5', 5".

FIG. 4a schematically shows a side view of a panel 2 and a payload 3 before assembly, FIG. 4b schematically shows a side view of a panel 2 and a payload 3 after assembly and FIG. 4c schematically shows a front view of a panel 2 and a payload 3. FIG. 4a-4c shows the same as FIG. 2a-2c but with the difference that only one payload 3 is mounted onto the panel 2.

Figure 5:
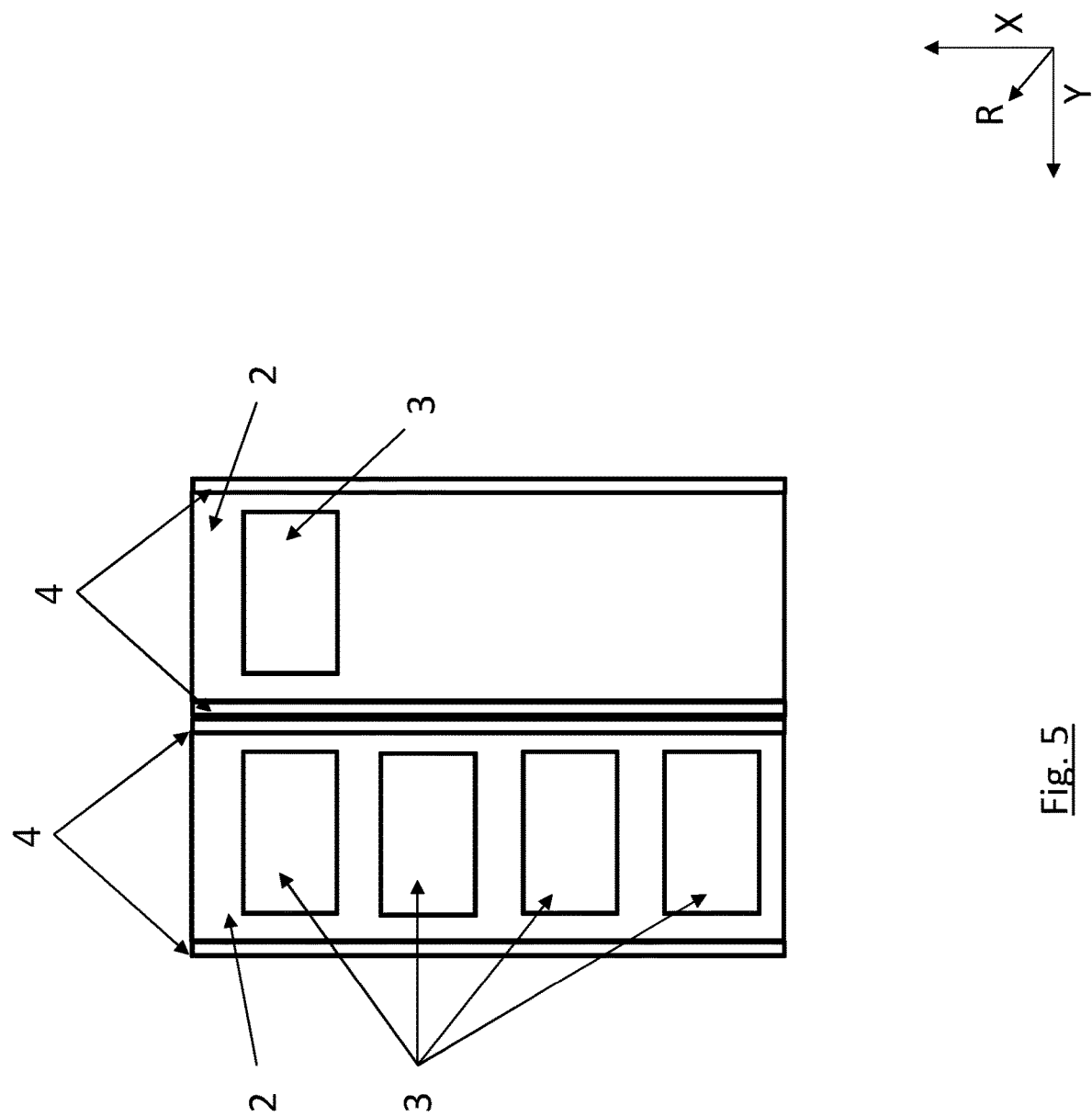
FIG. 5 schematically shows a front view of two panels attached to each other.

FIG. 5 schematically shows a front view of two panels 2 attached to each other. One panel 2 is identical to what is shown in FIGS. 2a-2c and one panel is identical to what is shown in FIGS. 4a-4c. FIG. 5 thus only shows an example of that panels 2 with different amount of payloads can be combined.

FIG. 6 schematically shows a front view of three panels 2 attached to each other, and in addition to the two panels 2 in FIG. 5, there is also a third panel attached to the other two without any payload to further broaden the example of the possibility to attach differently equipped panels to each other.

FIG. 7 schematically shows a side view of an assembled payload dispenser. FIG. 7 shows that at least one panel 2 comprises panel portions 5', 5" attached to each other forming the panel 2. In FIG. 7 the panel portions 5', 5" are connected to each other in the longitudinal direction X and in the lateral direction Y. The panels 2 are attached to each other via the longitudinally extending attachment means 4 and the panel portions 5', 5" are fixedly attached to each other along the laterally extending attachment means 6. The attachment means 4, 6 are positioned in the envelope surface of the dispenser, which means that the lateral extension refers to a direction perpendicular to the longitudinal direction but along the envelope surface. In FIG. 7 the dispenser is cylindrical, but different shapes are possible. However, common for all shapes are that the attachment means 4, 6 are positioned in the envelope surface of the dispenser 1. The attachment means 4, 6 may e.g. be in form of at least one payload dispenser joint 10, as will be disclosed more in detail below.

When the panels 2 are viewed separately as in FIGS. 2a-2c and 4a-4c, or attached to each other but in a flat state as in FIGS. 3, 5 and 6, then the lateral direction Y is perpendicular to the longitudinal direction as in Cartesian coordinates.

Figure 8:
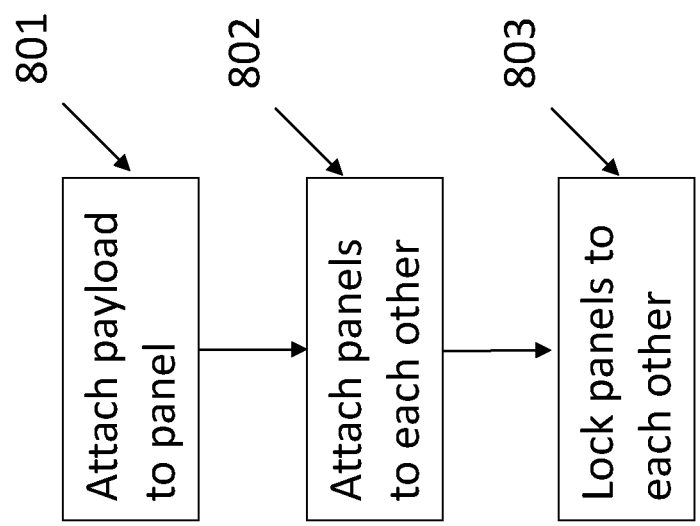
FIG. 8 schematically shows a flow chart of a method for assembly of the payload dispenser.

FIG. 8 schematically shows a flow chart of a method for assembly of the payload dispenser.

Box 801 relates to the step of mounting at least one payload 3 onto one panel 2. The step of mounting the at least one payload 3 onto one panel is advantageously done before assembly of the panels 2.

Box 802 relates to the step of attaching the panels 2 to each other via longitudinally extending attachment means 4.

Box 803 relates to the step of locking the attachment means 4 in position to hinder movement between the panels 2 forming a self-supporting dispenser 1.

As described above, the panels 2 can be made from panel portions 5', 5" and the panel portions are connected to each other via laterally extending attachment means 6. The panels 2 are attached to each other via the longitudinally extending attachment means 4. The method steps in connection to Boxes 802 and 803 can then be described as follows:

Box 802 relates to the step of attaching the panels 2 to each other via longitudinally extending attachment means 4. According to one example, the panel portions 5', 5" are attached to each other via the laterally extending attachment means 6 before the panels 2 are attached to each other via the longitudinally extending attachment means 4. According to another example, panel portions 5', 5" are attached to each other via the longitudinally extending attachment means 4 forming dispenser portions and the panel portions, i.e. the panel portions 5', 5" are then attached to each other via the laterally extending attachment means 6. In the latter example the dispenser can be built in sections where the dispenser portions are positioned on top of each other in the height direction, i.e. the longitudinal direction.

Box 803 relates to the step of locking the attachment means 4, 6 in position to hinder movement between the panels 2 forming the self-supporting dispenser 1.

Figure 9:
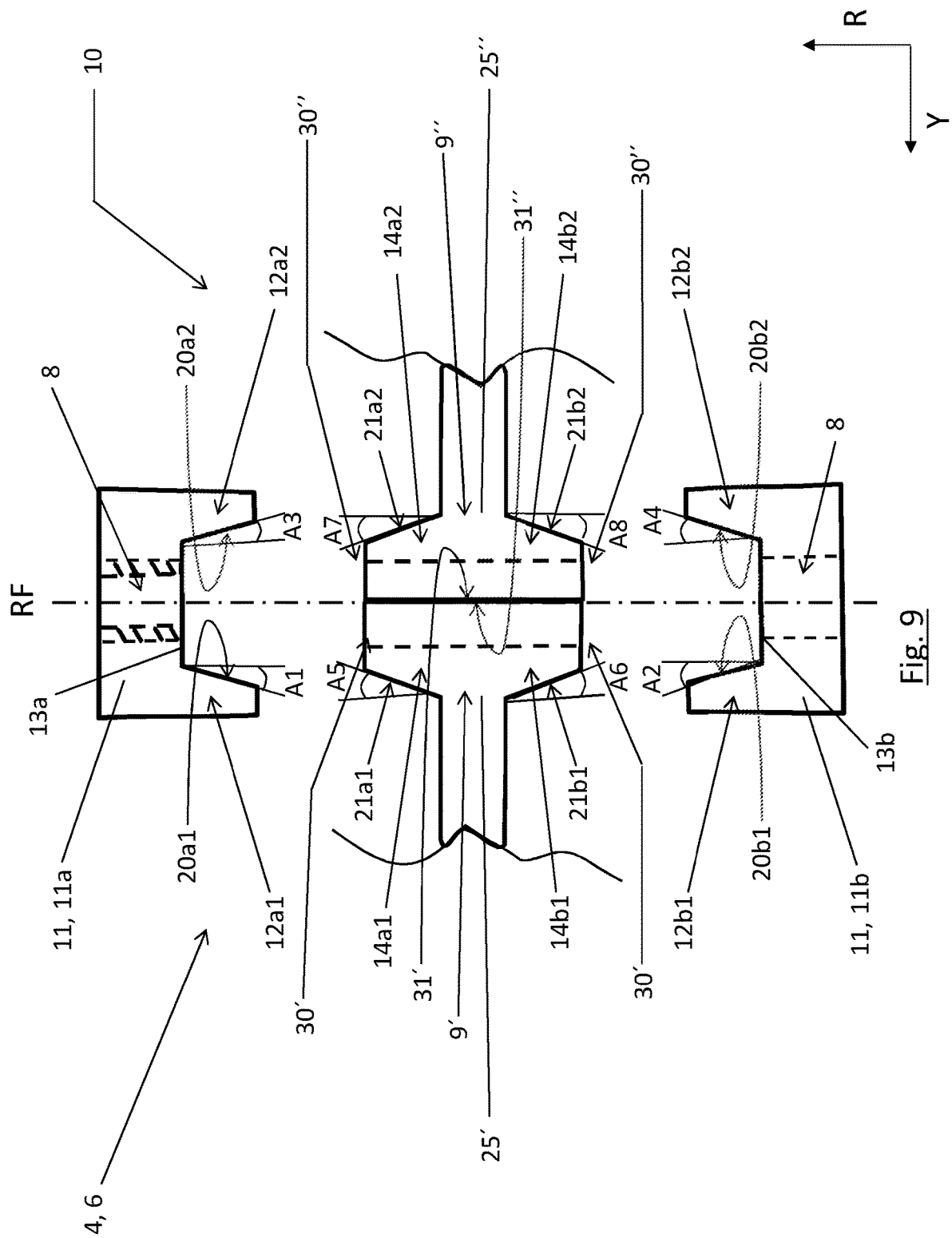
FIG. 9 schematically shows an enlarged view of an attachment means in form of a disassembled payload dispenser joint.

FIG. 9 schematically shows an enlarged view of an example of an attachment means 4, 6 in form of a disassembled payload dispenser joint 10. The payload dispenser joint 10, configured for detachably attach two adjacent panels of a payload dispenser to each other, comprises a clamp 11, comprising an inner clamp portion 11a and an outer clamp portion 11b. The outer clamp portion 11b faces the inner clamp portion 11a. Each clamp portion 11a, 11 b comprise a through opening 8. The joint 10 further comprises a bolt, not shown in FIG. 9, configured to be arranged in the through openings 8.

The inner clamp portion 11a comprises a first and second inner clamp flange 12a1, 12a2, and an inner mid portion 13a provided between the first and second inner flanges 12a1, 12a2. The outer clamp portion 11b comprises a first and second outer clamp flange 12b1, 12b2, and an outer mid portion 13b provided between the first and second outer flanges 12b1, 12b2.

The joint 10 further comprises a first panel end portion 25' of a first panel, comprising a first end section 9', and a second panel end portion 25" of a second panel comprising a second end section 9". The first and the second panels are neighboring, or adjacently arranged, panels of a payload dispenser. The first end section 9' comprises a first outer panel flange 14b1 and a first inner panel flange 14a1, and the second end section 9" comprises a second outer panel flange 14b2 and a second inner panel flange 14a2.

The first end section 9' comprises a first contact surface 31' formed by a portion of an outer surface 30' of the first outer panel flange 14b1 and by a portion of an outer surface 30' of the first inner panel flange 14a1, and wherein the second end section 9" comprises a second contact surface 31" formed by a portion of an outer surface 30" of the second outer panel flange 14b2 and by a portion of an outer surface 30" of the second inner panel flange 14a2, wherein the first and second contact surfaces 31 ", 31" are abutting each other in the joint 10, forming a reference plane RP. The first and second surfaces need not be flat per se, but can be curved or may comprise steps or step like elevations that takes up forces in a chosen direction. The reference plane RP is then taken along a line running from edge to edge of the contact surfaces.

An essentially planar first inner clamp locking surface 20a1 of the first inner clamp flange 12a1 is arranged at a first angle A1 in relation to the reference plane RP.

An essentially planar first outer clamp locking surface 20b1 of the first outer clamp flange 12b1 is arranged at a second angle A2 in relation to the reference plane RP.

An essentially planar locking second inner clamp locking surface 20a2 of the second inner clamp flange 12a2 is arranged at a third angle A3 in relation to the reference plane RP.

An essentially planar second outer clamp locking surface 21b2 of the second outer clamp flange 12b2 is arranged at a fourth angle A4 in relation to the reference plane RP.

An essentially planar first inner panel locking surface 21a1 of the first inner panel flange 14a1 is arranged at a fifth angle A5 in relation to the reference plane RP.

An essentially planar first outer panel locking surface 21b1 of the first outer panel flange 14b1 is arranged at a sixth angle A6 in relation to the reference plane RP.

An essentially planar second inner panel locking surface 21a2 of the second inner panel flange 14a2 is arranged at a seventh angle A7 in relation to the reference plane RP.

An essentially planar second outer locking surface 21b2 of the second outer panel flange 14b2 is arranged at an eight angle A8 in relation to the reference plane RP.

The first inner clamp flange 12a1 is arranged against the first inner panel flange 14a1 and the first angle A1 is equal to or smaller or greater than the fifth angle A5.

The first outer clamp flange 12b1 is arranged against the first outer panel flange 14b1 and the second angle A2 is equal to or smaller or greater than the sixth angle A6.

The second inner clamp flange 12a2 is arranged against the second inner panel flange 14a2 and the third angle A3 is equal to or smaller or greater than the seventh angle A7.

The second outer clamp flange 12b2 is arranged against the second outer panel flange 14b2 and the fourth angle A4 is equal to or smaller or greater than the eight angle A8.

The herein disclosed example of a payload dispenser joint 10 may be used both as longitudinal attachment means 4 and as lateral attachment means 6.

Figure 10:
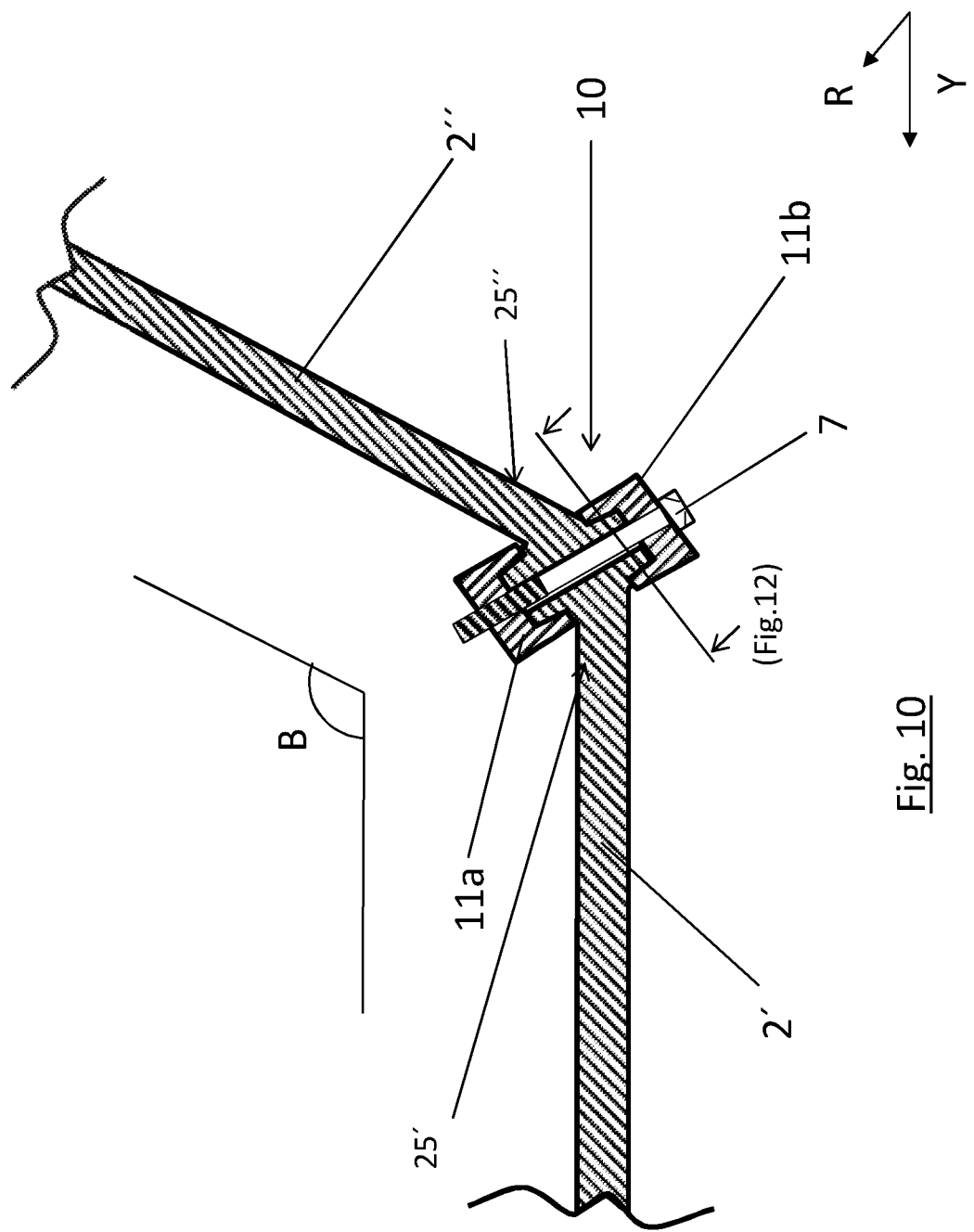
FIG. 10 schematically shows an example of an attachment means in form of an assembled payload dispenser joint.

FIG. 10 schematically shows an example of an attachment means in form of an assembled payload dispenser joint 10. In the example shown in FIG. 10 the payload dispenser joint 10 is arranged to lock two neighboring, i.e. adjacently arranged, essentially planar panels 2', 2" together in longitudinal direction X at an angle B.

However, the payload dispenser 10 may also be used to connect panels to each other, also referred to as arrange, assemble or lock panels to each other, at larger or narrower angles than angle B. Also, the panels do not necessarily have to be essentially planar as in the example shown in FIG. 10. According to other realizations the panels may e.g. be slightly bent outwardly.

In FIG. 10 two neighboring panels 2', 2" are connected to each other in the longitudinal direction X, but, as previously disclosed, the payload dispenser joint 10 may also be used to connect two neighboring panels in lateral direction Y.

Further, in the example shown in FIG. 10 the payload dispenser joint 10 has an essentially rectangular outer shape when being assembled and thereby connecting the panels 2', 2" to each other such that a dispenser is formed. However, this is just one example of a payload dispenser 10 according to the present disclosure. Other configurations, necessarily not forming an essentially rectangular payload dispenser joint, are also possible. The payload dispenser joint may e.g. adopt an essentially trapezoid, hexagonal or octagonal outer shape.

The outer shape of the payload dispenser joint and the angle at which two neighboring panels are connected to each other are e.g. dependent on the configuration of the dispenser and the configuration on the panels. The size of the panels, the number of panels, the size of the dispenser, the form of the dispenser, if the panels e.g. are essentially planar or outwardly bulging, i.e. if the panels are slightly bent outwardly, if the panels are connected in longitudinal or lateral direction etc. are examples of conditions that may affect the outer shape of the payload dispenser joint and the angle at which two neighboring panels are connected.

Figure 11:
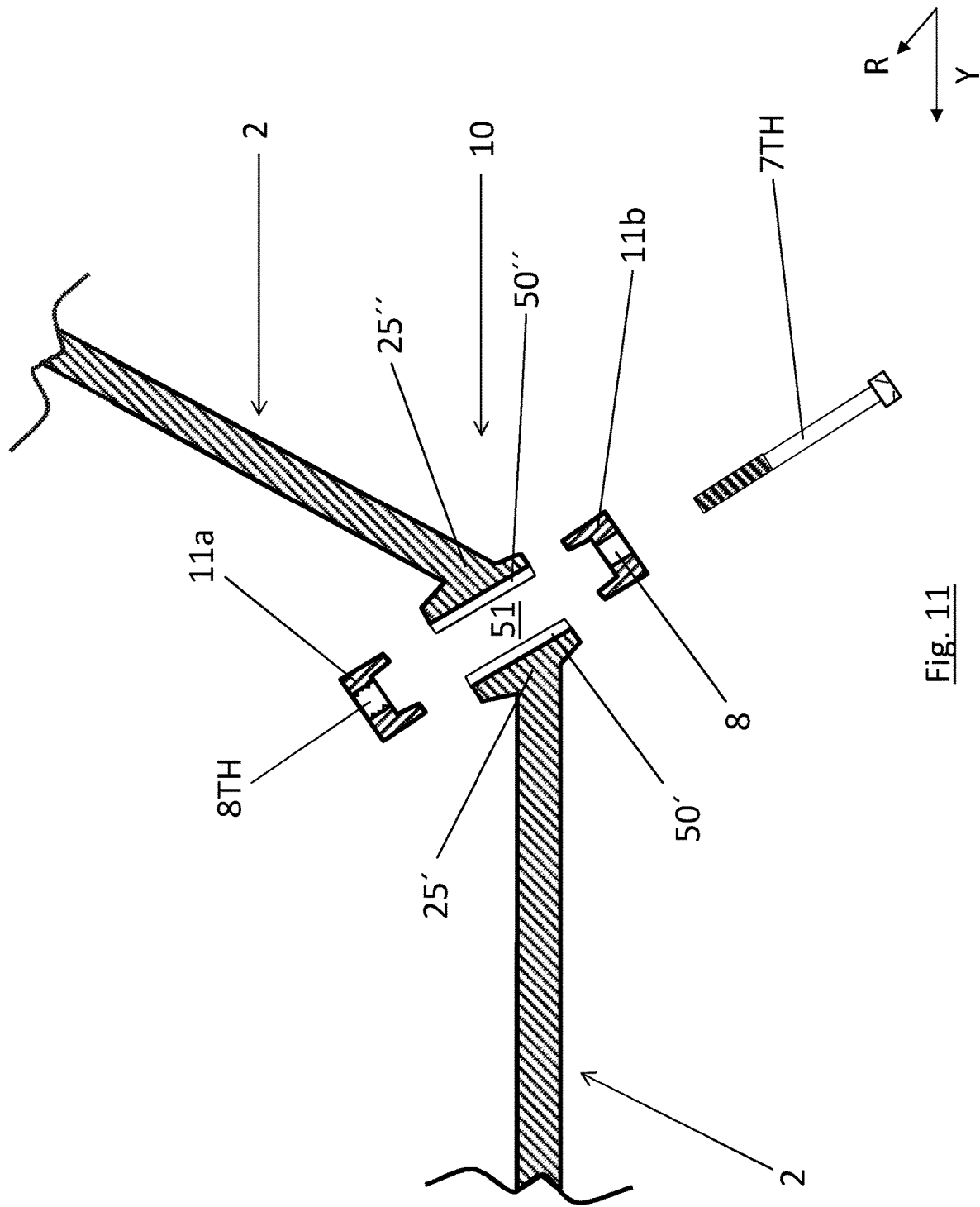
FIG. 11 schematically shows an example of an attachment means in form of a disassembled payload dispenser joint.

FIG. 11 schematically shows an example of an attachment means in form of a disassembled payload dispenser joint 10. According to the exemplary embodiment of a payload dispenser joint 10 disclosed in FIG. 11, the first panel end portion 25' and the second panel end portion 25" of the panels 2 comprises cooperating channels 50', 50" forming a through opening 51 configured for receiving a threaded bolt 7TH of the joint 10.

FIG. 11 further shows that the inner clamp portion 11a comprises threaded through opening 8TH, allowing the threaded bolt 7TH to be threaded in the threaded opening 8TH.

In FIG. 11 the through opening 8 of the outer clamp portion 11b is not threaded. However, according to other realizations, not shown, the outer clamp portion 11b may comprise a threaded through opening instead of the inner clamp portion, whereby by the bolt is configured correspondingly.

Figure 12:
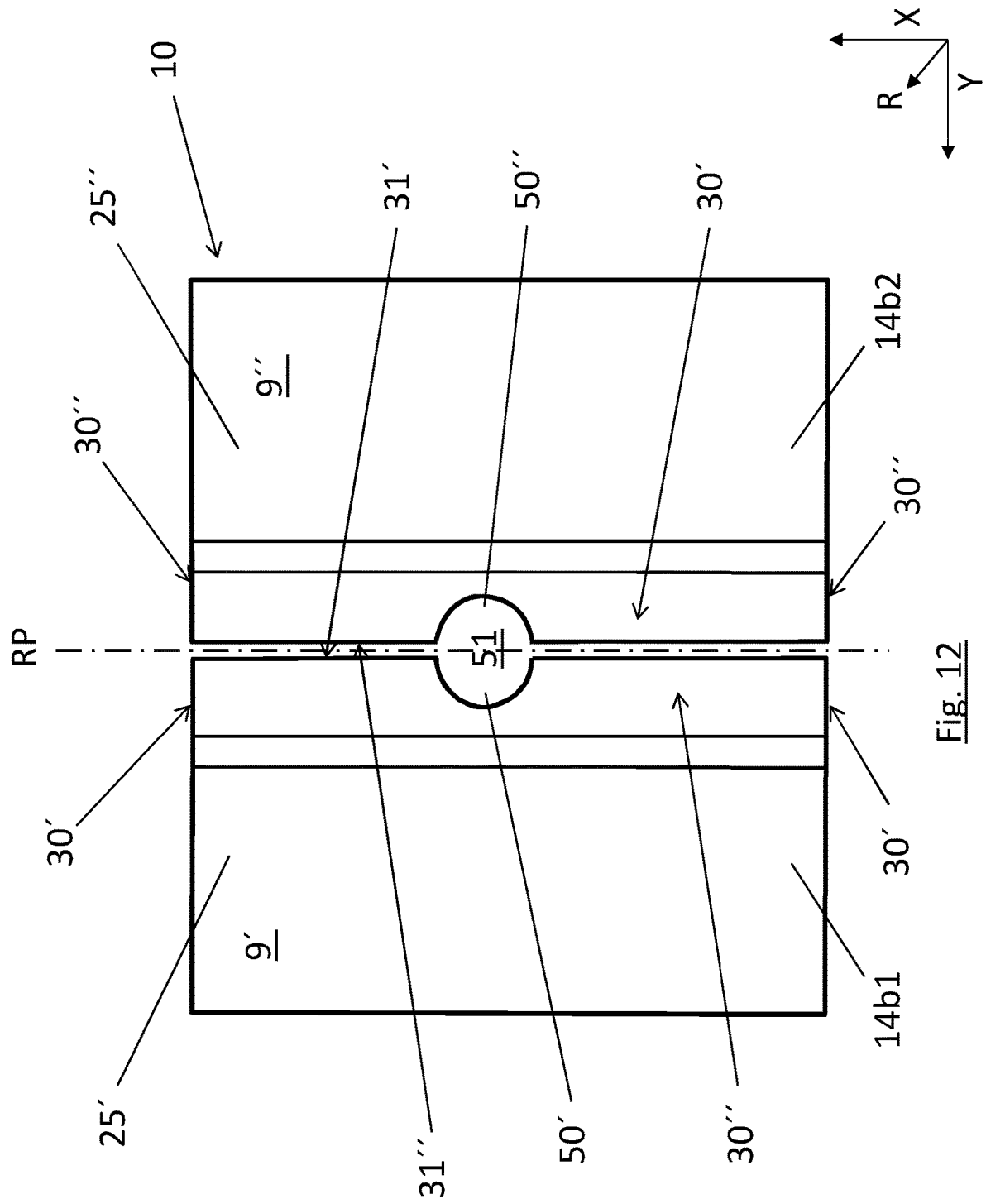
FIG. 12 schematically shows a side view of panel flanges forming through opening, and
FIG. 13 schematically shows a cut away side view of interacting locking surfaces.

FIG. 12 schematically shows a side view of a first outer panel flange 14b1, of a first end section 9' of a panel end portion 25', and of a second outer panel flange 14b2, of a second end section 9" of a panel end portion 25", forming through opening 51, wherein the through opening is configured to receive a bolt (not shown).

The first end section 9' comprises a first contact surface 31' formed by a portion of an outer surface 30' of the first outer panel flange 14b1 and by a portion of an outer surface 30' of the first inner panel flange. The second end section 9" comprises a second contact surface 31" formed by a portion of an outer surface 30' of the second outer panel flange 14b2 and by a portion of an outer surface 30" of the second inner panel flange. When the payload dispenser joint is assembled the first and second contact surfaces 31', 31" are abutting each other, forming a reference plane RP.

FIG. 13 schematically shows a cut away side view of interacting locking surfaces. In FIG. 13 a first outer panel flange 14b1, of a first end section 9', and a second outer panel flanges 14b2, of a second end section 9" is shown.

FIG. 13 shows, as in FIG. 12, the first end section 9' comprising a first contact surface 31' formed by a portion of an outer surface 30' of the first outer panel flange 14b1 and by a portion of an outer surface 30' of the first inner panel flange. The second end section 9" comprises a second contact surface 31" formed by a portion of an outer surface 30' of the second outer panel flange 14b2 and by a portion of an outer surface 30" of the second inner panel flange. The first end section 9' and the second end section 9" comprise cooperating channels 50', 50" forming a through opening 51 for receiving a bolt 7 (not shown). When the payload dispenser joint 10 is assembled the first and second contact surfaces 31', 31" are abutting each other, forming the reference plane RP.

In FIG. 13 is further indicated, by dotted lines, the extension of the interacting surfaces, i.e. the first inner clamp (flange) locking surface 20a1, the second inner clamp (flange) locking surface 20a2, the first outer clamp (flange) locking surface 20b1, the second outer clamp (flange) locking surface 20b2, the first inner panel (flange) locking surface 21a1, the second inner panel (flange) locking surface 21a2, the first outer panel flange (locking) surface 21b1 and the second outer panel flange (locking) surface 21b2.

FIG. 13 shows the joint and panel from the outside of the dispenser, but could just the same be showing a view from the inside.

Two narrowly arranged dotted lines indicate a difference in width, i.e. in the lateral direction Y, of the inner or outer mid portion 13a, 13b with relation to the corresponding and combined width of the panel flange 14b1, 14b2 portions between the contact surfaces 31 'and 31" and respective panel flange locking surface 21a1, 21a2, 21b1, 21b2. The difference may depend on that the contact surfaces 31', 31" have not yet found their end positions, i.e. that clamp portions shall be brought further towards each other by the bolt such that further pressure will be applied on the panel flanges in the lateral direction Y, i.e. in the direction diminishing the gap between the contact surfaces 31', 31". The difference may also be the consequence of a chosen design with a more narrow inner or outer mid portion 13a, 13b with relation to the corresponding and combined width of the panel flange 14b1, 14b2.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS 1. payload dispenser
2, 2', 2". panel
3. payload
4. longitudinal attachment means
5', 5" first and second panel portion
6. lateral attachment means
7. bolt
7TH. threaded bolt
8. through opening
8TH. threaded through opening
9', 9". first and second end section
10. payload dispenser joint
11. clamp
11a. inner clamp portion
11b. outer clamp portion
12a1. first inner clamp flange
12a2. second inner clamp flange
12b1. first outer clamp flange
12b2. second outer clamp flange
13a. inner mid portion
13b. outer mid portion
14a1. first inner panel flange
14a2. second inner panel flange
14b1. first outer panel flange
14b2. second outer panel flange
20a1. first inner clamp (flange) locking surface
20a2. second inner clamp (flange) locking surface
20b1. first outer clamp (flange) locking surface
20b2. second outer clamp (flange) locking surface
21a1. first inner panel (flange) locking surface
21a2. second inner panel (flange) locking surface
21b1. first outer panel flange (locking) surface
21b2. second outer panel flange (locking) surface
25', 25" first and second panel end portion
30', 30". outer surface
31', 31". first and second contact surface
50', 50". channels
51. through opening
X. panel extension in longitudinal direction
R. panel extension in radial direction, i.e. thickness direction
Y. panel extension in lateral direction
RP. reference plane
A1-A8. first-eight angle

The invention claimed is:

1. A payload dispenser joint for detachably attaching to each other two adjacent panels of a payload dispenser for a launch vehicle of a satellite, wherein
the joint comprises:
a clamp, comprising an inner clamp portion and an outer clamp portion facing the inner clamp portion, each clamp portion comprising a through opening; and
a bolt, configured to arrange in the through openings,
wherein the inner clamp portion comprises a first and second inner clamp flange and an inner mid portion between the first and second inner flanges,
wherein the outer clamp portion comprises a first and second outer clamp flange and an outer mid portion between the first and second outer flanges,
wherein the joint comprises a first panel end portion of a first panel comprising a first end section and a second panel end portion of a second panel comprising a second end section,
wherein the first and the second panels are neighboring panels of the payload dispenser,
wherein the first end section comprises a first outer panel flange and a first inner panel flange,
wherein the second end section comprises a second outer panel flange and a second inner panel flange, wherein the first end section comprises a first contact surface formed by a portion of an outer surface of the first outer panel flange and by a portion of an outer surface of the first inner panel flange, wherein the second end section comprises a second contact surface formed by a portion of an outer surface of the second outer panel flange and by a portion of an outer surface of the second inner panel flange, wherein the first and second contact surfaces are abutting each other in the joint forming a reference plane, wherein a first inner clamp locking surface of the first inner clamp flange is arranged at a first angle to the reference plane, wherein a first outer clamp locking surface of the first outer clamp flange is arranged at a second angle to the reference plane, wherein a second inner clamp locking surface of the second inner clamp flange is arranged at a third angle to the reference plane, wherein a second outer clamp locking surface of the second outer clamp flange is arranged at a fourth angle to the reference plane, wherein a first inner panel locking surface of the first inner panel flange is arranged at a fifth angle to the reference plane, wherein a first outer panel locking surface of the first outer panel flange is arranged at a sixth angle to the reference plane, wherein a second inner panel locking surface of the second inner panel flange is arranged at a seventh angle to the reference plane, and wherein a second outer panel locking surface of the second outer panel flange is arranged at an eighth angle to the reference plane.

2. The payload dispenser joint according to claim 1, wherein the first inner clamp flange is arranged against the first inner panel flange and the first angle is equal to or smaller or greater than the fifth angle, wherein the first outer clamp flange is arranged against the first outer panel flange and the second angle is equal to or smaller or greater than the sixth angle, wherein the second inner clamp flange is arranged against the second inner panel flange and the third angle is equal to or smaller or greater than the seventh angle, wherein the second outer clamp flange is arranged against the second outer panel flange and the fourth angle is equal to or smaller or greater than the eight angle.

3. The payload dispenser joint according to claim 1, wherein the inner clamp portion or outer clamp portion comprises a threaded through opening for allowing an at least partly threaded bolt to thread in the threaded through opening.

4. The payload dispenser joint according to claim 1, wherein the first end section of the first panel and the second end section of the second panel comprise cooperating channels forming a through opening for receiving the bolt of the joint.

5. A payload dispenser for a launch vehicle, wherein the dispenser comprises a plurality of panels, wherein at least one panel comprises at least one payload mounted onto the panel, wherein the plurality of panels includes two adjacent panels, and wherein the plurality of panels are attachable to each other by at least one payload dispenser joint according to claim 1 forming a self-supporting dispenser.

6. The payload dispenser according to claim 5, wherein at least one panel does not have a payload attached or wherein each panel of the plurality of panels comprises at least one payload.

7. The payload dispenser according to claim 5, wherein at least one panel comprises a plurality of payloads.

8. The payload dispenser according to claim 5, wherein the payload is a satellite.

9. The payload dispenser according to claim 5, wherein the payload dispenser has an extension in a longitudinal direction and in a radial direction, wherein each panel comprises an attachment in the longitudinal direction, and wherein the attachment is attachable to neighboring panels.

10. The payload dispenser according to claim 5, wherein the payload dispenser is delimited in the radial direction by the panels forming an envelope surface, wherein the panels are attachable to each other in an interface running in the longitudinal direction.

11. The payload dispenser according to claim 5, wherein the payload dispenser joints are arranged to lock in position with relation to each other to allow for the self-supporting dispenser.

12. The payload dispenser according to claim 5, wherein the payload dispenser is delimited in a lateral direction by the panels, wherein each panel has an unbroken extension in the longitudinal direction.

13. The payload dispenser according to claim 5, wherein at least one panel comprises panel portions attached to each other forming the panel.

14. The payload dispenser according to claim 13, wherein the panel portions are connected to each other in longitudinal direction and/or lateral direction.

15. The payload dispenser according to claim 13, wherein the panel portions are fixedly attached to each other.

16. The payload dispenser according to claim 5, wherein the payload is mounted onto the panel before assembly of the dispenser.

17. The payload dispenser according to claim 5, wherein the dispenser is a primary load bearing structure.

18. A method for assembly of a payload dispenser according to claim 5, wherein the method comprises the steps of:

mounting at least one payload onto one panel, attaching the panels to each other via longitudinally extending attachment, and locking the attachment in position to hinder movement between the panels forming a self-supporting dispenser.

19. The method according to claim 18, wherein the method comprises the step of mounting at least one payload onto each panel before assembly of the panels.

* * * * *